Figure 1:
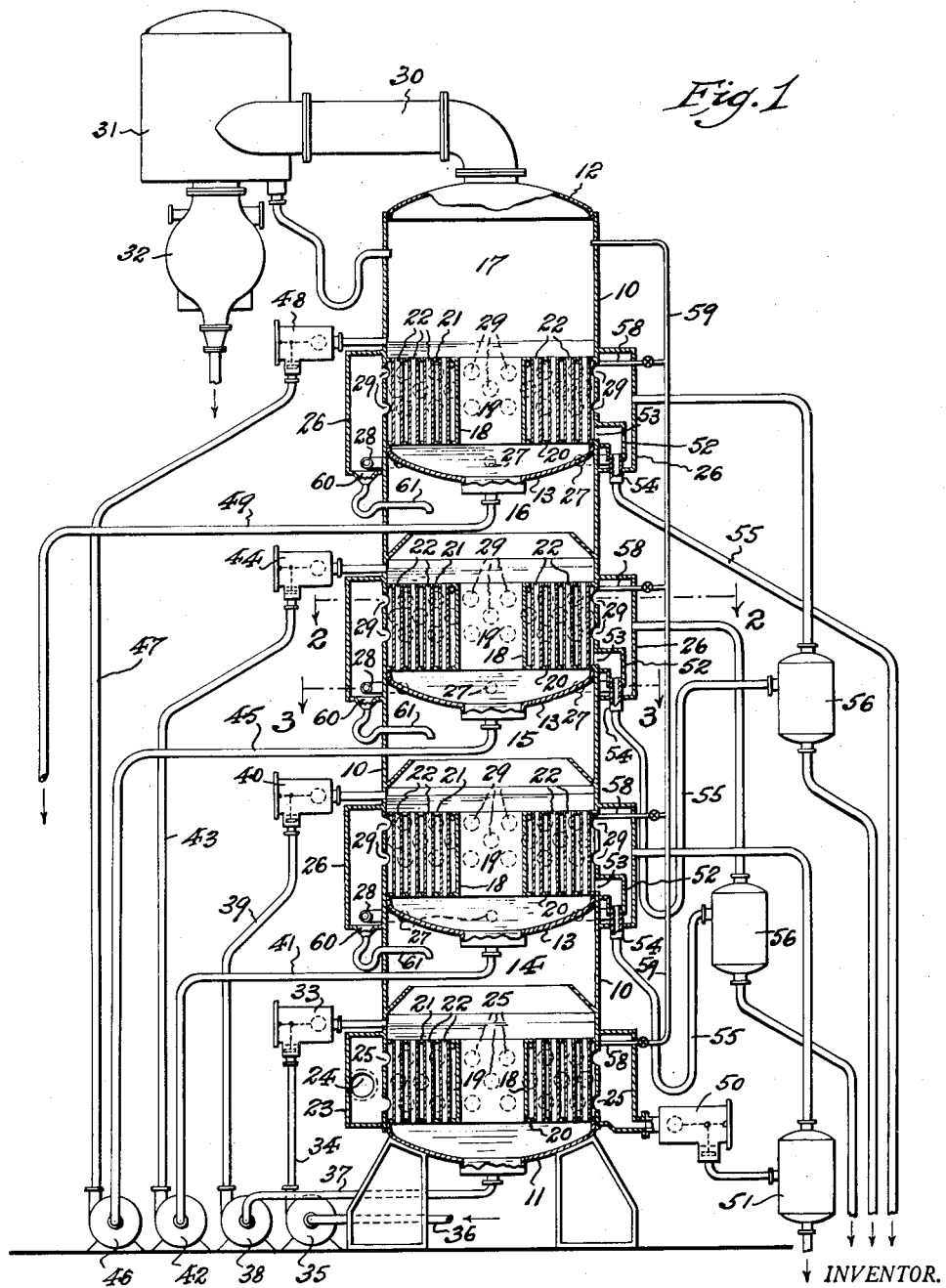

INVENTOR.
Reinier P. DeVries,
BY George D. Richards
Attorney

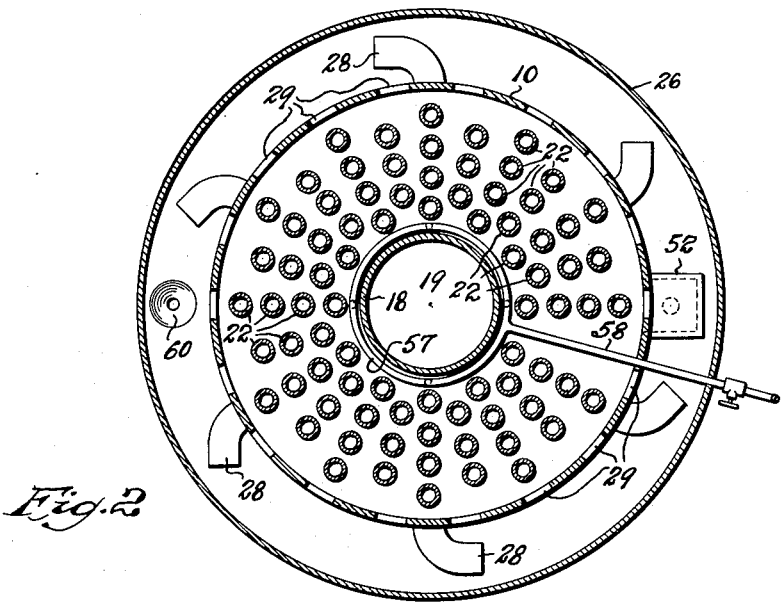
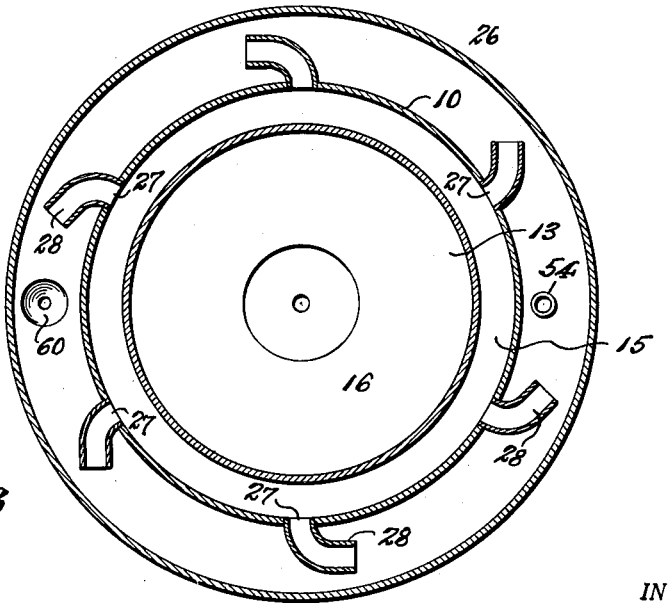

2,750,999
MULTIPLE EFFECT EVAPORATOR TOWER

Reinier P. De Vries, Melrose, Mass.

Application February 4, 1954, Serial No. 408,212

3 Claims. (Cl. 159—18)

This invention relates to improvements in multiple effect evaporator apparatus of the type comprising a single columnar shell subdivided to provide a compact and relatively low cost vertical succession of vacuum pans or evaporator chambers, so related that the hot vapor given off from a solution subject to evaporation in a preceding chamber is used to supply heat for evaporating a solution in a succeeding chamber.

The invention has for an object to provide, in evaporator apparatus of the stated type, novel means for delivering hot vapor from a preceding to a succeeding evaporator chamber, including improved means for removing from the hot vapor, so delivered from a preceding to a succeeding evaporator chamber, any entrained liquid solution for recovery by return of the same to the solution in the preceding evaporator chamber, and also including improved means for discharging water of condensation from the heater drums of the evaporator chambers.

The invention has for a further object to provide efficient means for controlling flow of solution, undergoing evaporation, successively from one evaporator chamber to another so as to attain the desired multiple effect evaporation.

The above and other objects will be understood from a reading of the following detailed description of an evaporator apparatus according to this invention, in connection with the accompanying drawings thereof, in which:

Fig. 1 is a sectional elevational view of the multiple effect evaporator tower according to this invention; Fig. 2 is a horizontal transverse sectional view, taken on line 2—2 in Fig. 1, but drawn on an enlarged scale; and Fig. 3 is another horizontal transverse sectional view, taken on line 3—3 in Fig. 1, but also drawn on an enlarged scale.

Similar characters of reference are employed in the above described views, to indicate corresponding parts.

Referring to the drawings, the reference character 10 indicates the columnar shell of the multiple effect evaporator tower. Said shell 10 may comprise one or any selected number of sections suitably joined together end to end. Said shell is provided with a bottom end wall 11 and with a top end wall 12. The interior of the shell 10 is subdivided by vertically spaced apart, transverse partitions 13, whereby to provide an upwardly extending succession of evaporator chambers 14, 15, 16 and 17. Although four such evaporator chambers are shown, operative for quadruple effect evaporation, it will be obvious that more or less than such number thereof may be provided, according to the number of evaporation effects desired to be obtained.

Disposed across the interior of each evaporator chamber, intermediate upper and lower portions thereof, is an annular heater drum having an internal wall 18 which defines a central solution downflow passage 19 between said upper and lower portions of the evaporator chamber. The external wall of said heater drum is provided by the side walls of the shell 10. Said heater drum is closed by spaced apart bottom and top tube sheets 20 and 21, between which extend a multiplicity of endwise open solution containing tubes 22 in communication between the lower and upper portions of the evaporator chamber.

Mounted on and around the shell 10, in external surrounding relation to the position of the heater drum of the lowermost or first effect evaporator chamber 14, is an annular steam supply chest 23 to which steam is supplied, from a suitable source, through a tangentially entering delivery pipe 24, so that the delivered steam will move in whirling flow within said steam chest. That part of the wall of the shell 10 which bounds the heater drum of the first effect evaporator chamber 14, is provided with a multiplicity of intake ports 25, through which ports steam is delivered into the interior of the heater drum in surrounding relation to the solution containing tubes 22 thereof, whereby to give up its heat to the solution in said tubes, so as to cause boiling of the solution with evaporating effect thereupon.

Also mounted on and around the shell, in external surrounding relation to the position of the heater drums of the respective second effect evaporator chamber 15, the third effect evaporator chamber 16 and the fourth effect evaporator chamber 17 are respective annular steam chests 26. The lower portion of the respective steam chests 26 for said respective evaporator chambers are disposed to lap and surround the top end portion of the respective underlying evaporator chambers. Means is provided for discharging steam from an underlying evaporator chamber to the steam chest 26 of the next evaporator chamber above. This means comprises a plurality of circumferentially spaced discharge ports 27 provided in those parts of the wall of the shell 10 which respectively bound the top end portion of said underlying evaporator chamber. Extending from each said discharge port 27 into the lower interior of the adjacent steam chest 26 is a curved discharge nozzle 28, or like deflecting means, operative to tangentially direct the entering steam toward the outer wall of said steam chest 26, so that the entering steam will move around the interior of the steam chest in whirling flow. Those parts of the wall of the shell 10 which respectively bound the heater drums of the respective evaporator chambers 15, 16 and 17 are provided with a multiplicity of intake ports 29, through which steam is delivered from the respective steam chests 26 into the interior of said respective heater drums in surrounding relation to the solution containing tubes 22 of the latter, whereby to give up its heat to the solution in said tubes, so as to cause boiling of the solution with evaporating effect thereupon.

Connected with the top end wall 12 of the shell 10, to lead out from the upper end of the fourth or last effect evaporator chamber 17, is a conduit 30 which communicates with a suitable separator 31 and condenser 32 to which a vacuum pump (not shown) is connected in manner well known to the art.

A solution desired to be evaporated is delivered into the first effect evaporator chamber 14 to fill the same to a predetermined level above the heater drum within said chamber; said level being determined by a float controlled admission valve 33 which is connected in the line of the solution delivery pipe 34. Delivery of the solution can be made from a source thereof either by gravity or by means of a suitable pump 35 (as shown); said solution being brought to the pump from the source by a supply pipe 36.

Connected with the bottom of the first effect evaporator chamber 14 is an outlet pipe 37, which leads to a pump 38 operative to deliver partially evaporated solution from said first effect evaporator chamber 14 through a delivery pipe 39 to the second effect evaporator chamber 15, to fill the latter to a predetermined level above its heater drum; said level being determined by a float controlled admission valve 40, which is connected in the line of said delivery pipe 39. Similarly, connected with the bottom of the second effect evaporator chamber 15 is an outlet pipe 41, which leads to a pump 42 operative to deliver further evaporated solution from said second effect evaporator chamber 15 through a delivery pipe 43 to the third effect evaporator chamber 16, to fill the latter to a predetermined level above its heater drum, as determined by a float controlled admission valve 44. In like manner, connected with the bottom of the third effect evaporator chamber 16 is an outlet pipe 45, which leads to a pump 46 operative to deliver further evaporated solution from said third effect evaporator chamber 16 through a delivery pipe 47 to the fourth effect evaporator chamber 17, to fill the latter to a predetermined level above its heater drum, as determined by a float controlled admission valve 48.

The treated solution, as finally evaporated, is discharged from the fourth effect evaporator chamber 17 through a discharge pipe 49 leading from the bottom thereof; such discharge can be timed and controlled in any suitable manner known to the art, and delivery of the finally evaporated solution can be made to a suitable collecting or storage tank (not shown).

The multiple effect evaporating apparatus, among other uses, is well adapted for use in the sugar refining industry to remove a major portion of the water in a solution containing dissolved sugar solids; such solution being known as light sweet water. In operation of the apparatus for such use, all the evaporator chambers 14, 15, 16 and 17 are filled with the solution to predetermined levels above the heater drums thereof, so that the tubes 22 of said heater drums are filled with the solution.

Steam at approximately five pounds pressure, and at a temperature of 227° F., is delivered into the steam chest 23 which serves the first effect evaporator chamber 14, to flow thence through intake ports 25 into the communicating heater drum and around the tubes 22 of the latter, thus raising the temperature of the solution contained in said tubes to 212° F., its boiling point, whereby to give off steam of such temperature at zero pressure, with resultant evaporating effect upon the solution in said first effect chamber 14. The steam at 212° F. given off from the solution in the first effect evaporator chamber 14 is discharged from the latter through the discharge ports 27 and nozzles 28 into the steam chest 26 which serves the second effect evaporator chamber 15 to flow thence into the heater drum of this chamber. Since the pressure in the second effect evaporator chamber has been reduced to about eight inches of vacuum, the solution in this chamber, under the applied heat, will boil at approximately 197° F., giving off steam at such temperature. Steam from the evaporated solution in the second effect evaporator chamber is discharged to the steam chest 26 which serves the third effect evaporator chamber 16 for supply to the heater drum of the latter. Since the pressure in said third effect evaporator chamber 16 is further reduced to approximately seventeen inches of vacuum, the solution in this chamber will boil at approximately 173° F. so as to give off steam of that temperature. Steam from the evaporated solution in said third effect evaporator chamber 16 is, in like manner, discharged to the steam chest 26 which serves the fourth effect evaporator chamber 17 for supply to its heater drum. Since the pressure in the fourth effect evaporator chamber 17 has been reduced to about twenty-six inches of vacuum, the solution in this chamber will boil at approximately 125° F., the resulting vapor being discharged to the separator 31 and condenser 32.

When evaporated solution is drawn off from the fourth effect evaporator chamber 17 through the discharge pipe 49, the resultant lowering of solution causes the intake float controlled valve 48 to open, whereupon solution from the third effect evaporator chamber 16 will be pumped into said fourth effect evaporator chamber 17 to replace the evaporated solution discharged from the latter. Such discharge of solution from the third effect evaporator chamber 16 lowers the level of the solution therein, so that the intake float controlled valve 44 will open and solution will be pumped into said chamber 16 from the second effect evaporator chamber 15. In like manner, lowering of the level of solution in the second effect evaporator chamber 15 causes its intake float controlled valve 40 to open, whereupon solution will be pumped from the first effect evaporator chamber 14 into said second effect evaporator chamber 15. Lowering of the level of solution in the first effect evaporator chamber 14 causes its intake float controlled valve 33 to open, so that replacement light sweet water will be pumped from the supply thereof into said first effect evaporator chamber.

Any water of condensation collecting in the initial steam chest 23, which serves the heater drum of the first effect evaporator chamber, collects in the bottom of said steam chest 23, and flows therefrom to a float controlled discharge valve 50, which opens, when accumulation is sufficient, whereby to discharge the same to a flash tank 51 which drains to a trap sealed collection tank (not shown).

Means is provided in connection with the respective heater drums 26 of the second, third and fourth effect evaporator chambers whereby water of condensation can be collected and drained away. To this end, the group of intake ports 29 in the wall of the shell 10, which enter a heater drum interior from a surrounding steam chest 26, are spaced sufficiently above the bottom tube sheet 20 of the heater drum as to form a catch basin in the bottom interior of said heater drum. Any condensate accumulating in said catch basin drains to at least one external collecting pan 52, which is open at 53 toward the catch basin interior. Said collecting pan 52 is welded to the exterior face of the wall of the shell 10, so as to extend into the interior of the steam chest 26, but is closed against communication with the latter. Leading from the bottom of the collecting pan 52, to extend through the bottom of the steam chest 26, for external projection from the latter, is a suitable coupling connection 54 which joins the outlet of the collecting pan to a trap sealed drain pipe 55. Said drain pipe 55 conducts the discharged condensate to a flash tank 56, which in turn drains to a trap sealed collection tank (not shown).

Means is also provided for removing from each heater drum interior any air or other non-condensable gases which may be carried by the stream delivered into the heater drum. An illustrative form of means for this purpose comprises a venting manifold 57 within each heater drum interior, from which a discharge pipe 58 extends to a suction line 59 disposed exteriorly of the shell 10. Said suction line 59 is connected in communication with the low pressure interior of the fourth or last effect evaporation chamber.

Since the steam or vapor which is discharged from a preceding evaporation chamber to the steam chest 26 of a succeeding evaporation chamber is so directed by nozzles 28 or the like as to move around the interior of the steam chest in whirling flow, any sugar liquids entrained in the steam or vapor will be thrown, by centrifugal force, against the external wall of the steam chest, and thus separated from the stream of steam or vapor. The thus separated sugar liquid will, under gravity, run down said wall surface to the bottom of the steam chest. Means is provided for returning such separated sugar liquid to the evaporator chamber whence it came. The means for this purpose comprises a preferably funnel-shaped outlet drain 60 which is provided in the bottom wall of the steam chest 26. Coupled to this outlet drain 60 is a trap sealed sugar liquid return pipe 61, which enters through the wall of the shell 10 into the interior of the underlying evaporator chamber. By this arrangement loss and waste of valuable sugar liquids is prevented, and uninterrupted evaporating effect can be continuously applied to a maximum quantity of light sweet water.

From the above it should now be comprehended that the instant invention provides a very compact and efficient multiple effect evaporating apparatus of the columnar shell type which requires but a minimum of floor space for installation, and which is of such novel construction as to provide highly efficient control and distribution of heat supplying steam or vapor from preceding to succeeding evaporator chambers; which provides highly efficient means for discharging water of condensation from the heat supplying steam or vapor, as well as means for removing air or non-condensable gases from the steam or vapor; and which prevents loss and waste of sugar liquids.

Having now described my invention, I claim:

1. In a multiple effect evaporator apparatus comprising a columnar shell interiorly subdivided to provide a vertical succession of evaporator chambers, an annular heater drum extending across the interior of each evaporator chamber from wall to wall of said shell, each heater drum having a multiplicity of perpendicular endwise open solution passage tubes, external annular steam chests completely encircling said shell to respectively surround and communicate with the heater drums of respective evaporator chambers, the lower portions of said steam chests being respectively disposed in lapping relation to the upper end portions of below adjoining evaporator chambers, the shell walls surrounding the upper portion of a preceding evaporator chamber intermediate the latter and a steam chest serving a succeeding evaporator chamber having a plurality of circumferentially spaced discharge ports through which vapor from said preceding evaporator chamber is delivered into said steam chest and curved discharge nozzles within the latter with which said discharge ports communicate, said nozzles having their discharge ends angularly directed toward and spaced from the external circumferential wall of the steam chest so as to induce whirling flow of entering vapor around the lower portion of the steam chest interior, whereby liquid entrained in the vapor is separated therefrom by centrifugal force within said lower interior portion of the steam chest, an external trap sealed return pipe to conduct said separated liquid from the bottom of the steam chest back to the evaporator chamber from whence it came, means for supplying high temperature initial steam to the heater drum of the lowermost evaporator chamber, means for delivering solution undergoing evaporation from a preceding to a succeeding evaporator chamber, means for discharging evaporated solution from the uppermost evaporator chamber, and means for withdrawing vapor from the uppermost evaporator chamber.

2. A multiple effect evaporator apparatus comprising a columnar shell interiorly subdivided to provide a vertical succession of evaporator chambers, an annular heater drum extending across the interior of each evaporator chamber from wall to wall of said shell, each heater drum having a multiplicity of perpendicular endwise open solution passage tubes, annular steam chests exteriorly mounted around said shell to respectively surround and communicate with the heater drums of respective evaporator chambers, the lower portions of said steam chests being respectively disposed in lapping relation to the upper end portions of below adjoining evaporator chambers, the upper portion of a preceding evaporator chamber intermediate the latter and a steam chest serving a succeeding evaporator chamber having a plurality of circumferentially spaced discharge ports through which vapor from said preceding evaporator chamber is delivered into said steam chest and curved discharge nozzles within the latter with which said discharge ports communicate, said nozzles being adapted to induce whirling flow of entering vapor around the steam chest interior, whereby liquid entrained in the vapor is separated therefrom by centrifugal force, a trap sealed return pipe to conduct said separated liquid from the bottom of the steam chest back to the evaporator chamber from whence it came, an annular steam chest surrounding the lowermost evaporator chamber in communication with the heater drum thereof to which high temperature initial steam is supplied, means including a pump for delivering solution undergoing evaporation from a preceding to a succeeding evaporator chamber, said delivering means comprising a delivery pipe including a float controlled admission valve operative to predetermine the level of solution in the evaporator chamber receiving the same, means for discharging evaporated solution from the uppermost evaporator chamber, and means for withdrawing vapor from the uppermost evaporator chamber.

3. A multiple effect evaporator apparatus according to claim 2, including means for discharging water of condensation from the bottom of each heater drum, and means for venting air and non-condensible gases from the heater drum interiors.

References Cited in the file of this patent

UNITED STATES PATENTS

| Number | Name | Date |
|---|---|---|
| 522,416 | Iles | July 3, 1894 |
| 643,794 | Harvey | Feb. 20, 1900 |
| 1,528,104 | Ewart et al. | Mar. 3, 1925 |
| 1,548,063 | Ray et al. | Aug. 4, 1925 |
| 2,172,236 | Baumann | Sept. 5, 1939 |
| 2,413,292 | Christensen | Dec. 31, 1946 |

FOREIGN PATENTS

| 576,838 | France | Aug. 27, 1924 |